United States Patent
Kuhne et al.

(10) Patent No.: US 8,167,002 B2
(45) Date of Patent: May 1, 2012

(54) FLOW RESTRICTOR

(75) Inventors: Jorg Kuhne, Jona (CH); Pino Pulli, Stafa (CH); Urs Keller, Hinwil (CH)

(73) Assignee: BELIMO Holding AG, Hinwil (CH)

( * ) Notice: Subject to any disclaimer, the term of this patent is extended or adjusted under 35 U.S.C. 154(b) by 0 days.

(21) Appl. No.: 12/742,128

(22) PCT Filed: Nov. 13, 2008

(86) PCT No.: PCT/EP2008/065452
§ 371 (c)(1),
(2), (4) Date: Aug. 30, 2010

(87) PCT Pub. No.: WO2009/062997
PCT Pub. Date: May 22, 2009

(65) Prior Publication Data
US 2010/0319784 A1     Dec. 23, 2010

(30) Foreign Application Priority Data
Nov. 15, 2007  (EP) .................................... 07405327

(51) Int. Cl.
*F15D 1/04* (2006.01)

(52) U.S. Cl. ................. 138/45; 138/37; 138/46; 138/43; 137/517; 137/504

(58) Field of Classification Search ..................... 138/45, 138/46; 137/507, 517
See application file for complete search history.

(56) References Cited

U.S. PATENT DOCUMENTS

| | | | | | |
|---|---|---|---|---|---|
| 2,593,315 | A | * | 4/1952 | Kraft | 138/45 |
| 2,899,981 | A | * | 8/1959 | Binks | 138/46 |
| 2,948,296 | A | * | 8/1960 | Thorburn | 137/517 |
| 3,409,050 | A | * | 11/1968 | Weese | 138/45 |
| 3,581,773 | A | * | 6/1971 | Warren | 138/26 |
| 4,230,149 | A | * | 10/1980 | Worthen et al. | 137/517 |
| 4,253,491 | A | * | 3/1981 | Worthen et al. | 137/601.2 |
| 4,345,428 | A | * | 8/1982 | Cook | 60/274 |
| 4,377,968 | A | * | 3/1983 | Gerry | 454/213 |
| 4,642,037 | A | * | 2/1987 | Fritchman | 417/571 |
| 4,688,433 | A | * | 8/1987 | Silverwater | 73/861.53 |
| 4,884,750 | A |   | 12/1989 | Werding | 239/337 |

FOREIGN PATENT DOCUMENTS

DE     33 08 745 A1     9/1984

* cited by examiner

*Primary Examiner* — Patrick F Brinson
(74) *Attorney, Agent, or Firm* — Sughrue Mion, PLLC

(57) ABSTRACT

The invention relates to a flow restrictor (1) for restricting a volume flow through a liquid line, said flow restrictor comprising a support (10) having a passage and a bent flat spring (11) attached to the support (10). The flat spring (11) comprises at least one spring tab (12) and the passage at least one opening (13), the spring tab (12) and the opening (13) having a substantially identical extension along a longitudinal direction. The spring tab (12) is designed and arranged above the opening (13) in such a manner that it increasingly rests against the support (10) with increasing differential pressure, thereby gradually making the opening (13) smaller and continuously reducing the passage within a defined pressure range. The dimensions of the opening (13) are adjusted corresponding to the size of the spring tab (12), thereby allowing a compact flow restrictor (1) which is less susceptible to dirt. The continuous reduction of the passage allows an increase in vibration resistance of the flow restrictor (1).

20 Claims, 7 Drawing Sheets

FLOW RESTRICTOR

CROSS REFERENCE TO RELATED APPLICATIONS

This application is a National Stage of International Application No. PCT/EP2008/065452 filed Nov. 13, 2008, claiming priority based on European Patent Application 07405327.3, Nov. 15, 2007, the contents of all of which are incorporated herein by reference in their entirety.

TECHNICAL FIELD

The present invention relates to a flow restrictor for limiting a volume flow through a liquid line. The present invention relates particularly to a flow restrictor which has a carrier with a passage and a bent flat form spring which is attached to the carrier, the flat form spring being designed to be flattened increasingly with a rising differential pressure.

PRIOR ART

Flow restrictors or flow rate regulators limit the volume flow through a liquid line, for example a pipe line, within a defined operating range of the differential pressure and thus make it possible to have a constant volume flow through the line independently of pressure changes in the line.

The patent specification GB 783,323 describes a flow restrictor which comprises a round flat form spring fastened, centered, to a carrier of round configuration. The carrier has a multiplicity of small round orifices which are arranged symmetrically about the center of the carrier on two concentric rings and which determine the maximum passage. With increasing liquid pressure in the pipe line, the flat form spring is flattened, so that the open region between the pipe line and flat form spring is reduced. According to GB 783,323, the flattening of the spring is not linear with respect to the increasing pressure, because the flattening commences at the center and advances outward, because the round configuration of the spring has the effect that, with increasing flattening, the non-flattened region decreases rapidly toward the marginal region. In the flow restrictor according to GB 783,323, the overall passage orifice is limited by the annularly arranged perforations which, moreover, have an increased risk of soiling and clogging due to their small size. Furthermore, there is an increased tendency to oscillation if, with an increasing flattening of the flat form spring, the individual holes are closed individually, and the overall passage is thereby reduced in steps.

U.S. Pat. No. 4,884,750 discloses a flow restrictor for limiting a volume flow through a liquid line, which has a carrier with a passage and a bent spring which is attached to the carrier and which is designed to be flattened increasingly with a rising differential pressure ($\Delta p$). The various forms of the springs either have the disadvantage of an insufficient volume flow or begin to oscillate with an increasing closure of the passage.

PRESENTATION OF THE INVENTION

An object of the present invention is to propose a flow restrictor for limiting a volume flow through a liquid line, which does not have at least some disadvantages of the prior art. In particular, an object of the present invention is to propose a flow restrictor which, as compared with the prior art, has a lower risk of soiling and a lower tendency to oscillation.

According to the present invention, these aims are achieved, in particular, by means of the elements of the independent claims. Further advantageous embodiments, moreover, may be gathered from the dependent claims and the description.

The flow restrictor for limiting a volume flow through a liquid line comprises a carrier with a passage (passage orifice) and a bent flat form spring which is attached to the carrier and which is designed to be flattened increasingly with a rising differential pressure. In this case, the passage comprises at least two orifices lying next to one another, and the carrier comprises a web which separates the orifices lying next to one another from one another. The spring tongue is then arranged so that, with a rising differential pressure, it increasingly lies upon the web and continuously reduces, that is to say increasingly closes, the orifices, the orifices remaining open in defined remaining regions.

The abovementioned aims are achieved by virtue of the present invention, in particular, in that the flat form spring has at least one spring tongue and the passage has at least one orifice, the spring tongue and the orifice having an essentially identical extent in each case in a longitudinal direction, and in that the spring tongue is configured and arranged above the orifice so that, with the rising differential pressure, it comes to bear increasingly onto the carrier and at the same time continuously reduces the orifice and continuously reduces the passage within a defined pressure range. By the orifice being dimensioned correspondingly to the size of the spring tongue, an overall larger passage and a reduced risk of soiling can be achieved in relation to the prior art, for a comparable size of the flow restrictor. In other words, with an identical overall passage, the flow restrictor can be designed to be more compact and to be less susceptible to dirt. By the flat form spring coming to bear on the carrier increasingly with a rising differential pressure, moreover, a non-linear increase in the spring resistance in the case of a rising pressure is achieved, but, due to the associated continuous reduction in the passage, a reduced tendency to oscillation, as compared with the prior art, is achieved.

In one design variant, the flat form spring is fastened to an outer marginal region of the carrier, and the at least one orifice extends from the outer marginal region, where the flat form spring is fastened, as far as the opposite outer marginal region of the carrier.

In a further design variant, the passage comprises a plurality of rotationally symmetrically arranged orifices, and the flat form spring comprises a plurality of rotationally symmetrically arranged spring tongues which are in each case arranged so that, with a rising differential pressure, they increasingly lie on the carrier and continuously reduce, that is to say increasingly cover, the orifices. In different design variants, the spring tongues are fastened to an outer marginal region of the carrier or in the center of the carrier.

In one design variant, the spring tongue is arranged above the orifice so that, with a rising differential pressure, it lies increasingly upon the side regions bordering the orifice and continuously reduces, that is to say increasingly covers, the orifice, the orifice remaining open in a defined remaining region.

In one design variant, the carrier is configured as a round disk which comprises, on the outer marginal region, an erected collar for insertion into a pipe line, for example into a connection piece between two pipe lines or into a valve, for example a ball valve or a lifting valve.

In one design variant, part of the collar is bent back onto the disk and clamps the flat form spring to the carrier.

In addition to the flow restrictor, the present invention relates, moreover, to a method for limiting a volume flow through a liquid line.

BRIEF DESCRIPTION OF THE DRAWINGS

An implementation of the present invention is described below by means of an example. The implementation example is illustrated by the following accompanying figures:

FIG. 9b shows another view of the flow restrictor of FIG. 9a.

WAYS OF IMPLEMENTING THE INVENTION

Figure 1A:
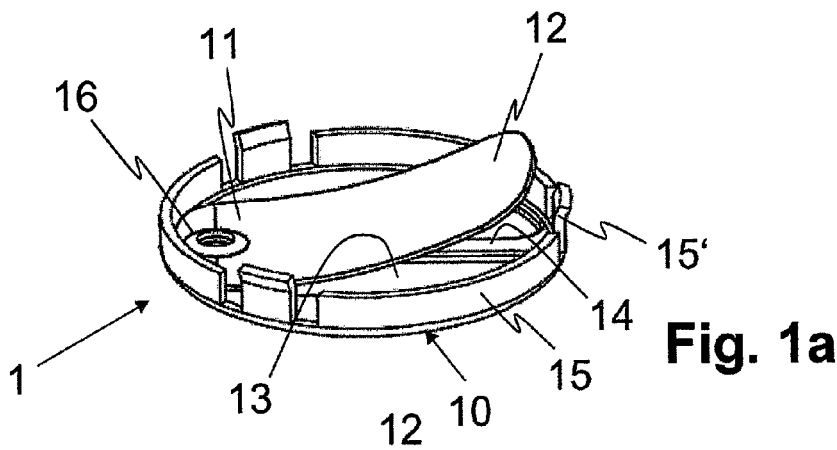
FIG. 1a shows a view of a flow restrictor with a flat form spring which is configured as a spring tongue and which is attached above two orifices separated from one another by a web.

In FIGS. 1a, 2a, 3a, 4, 5, 7, 8, 9a, 10 and 11, reference symbol 1 designates a flow restrictor which is also designated as a flow rate regulator and which limits the volume flow through a liquid line 2 within a defined operating range [$\Delta p_{min}$, $\Delta p_{max}$] of the differential pressure $\Delta p$. A pressure-independent volume flow $\dot{V}$ is achieved in that the passage of the flow restrictor 1, that is to say the throughflow cross section or throughflow area, is reduced as a function of the force generated from the differential pressure $\Delta p$. For this purpose, the flow restrictor 1 comprises a flat form spring 11 which is bent with a defined radius (of the order of magnitude of the liquid line 2, for example of the order of magnitude of the pipe diameter) and which is fastened to a carrier 10 of the flow restrictor 1 and is arranged above the passage orifices 13, 18, 23 of the flow restrictor 1 so that, with an increasing pressure $\Delta p$, it increasingly covers and closes the variable orifice area, that is to say the passage of the flow restrictor 1. In this case, the flat form spring 11 comes to bear increasingly onto the carrier 10, for example upon a web 14, 24 and/or upon side margins of the orifices 18, with the result that the flat form spring 11 becomes increasingly harder. The flat form spring 11 becomes harder because its effective length is reduced due to the fact that it comes to lie increasingly on the carrier 10. Thus, the passage and consequently the throughflow are regulated in a directed manner, also in the case of a relatively high differential pressure $\Delta p$, and are kept essentially constant within a specific operating range [$\Delta p_{min}$, $\Delta p_{max}$]. The passage orifices are in each case designed as perforations in the carrier 10.

Figure 4:
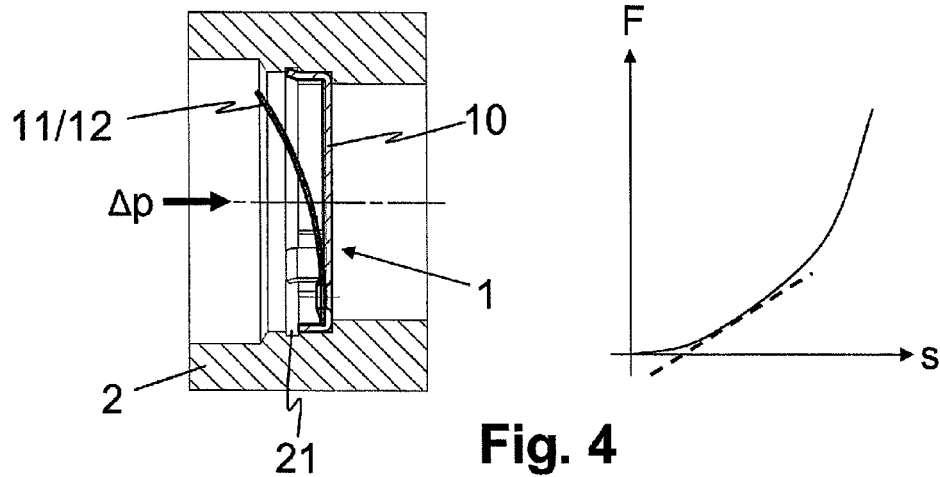
FIG. 4 shows a cross section through the flow restrictor in the case of a small pressure difference and with a correspondingly slightly deflected spring tongue, and also a curve which illustrates the non-linear dependence of the deflection and spring force.
Figure 5:
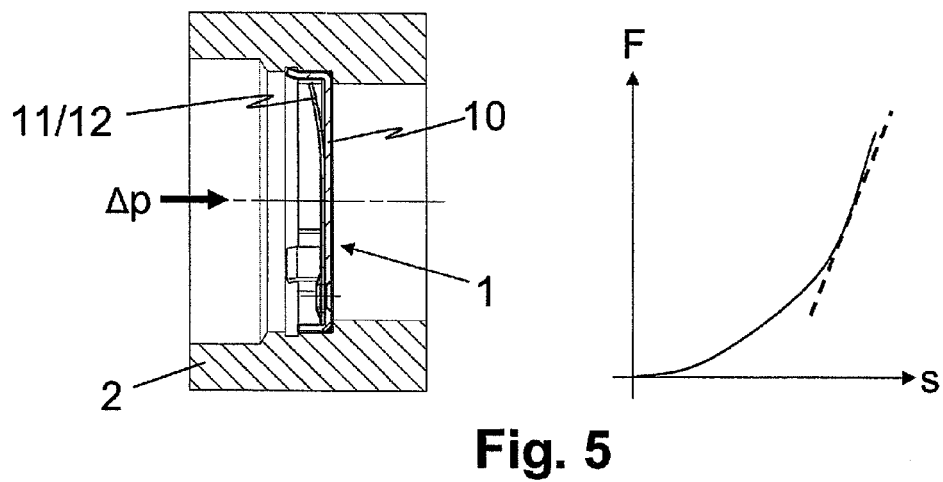
FIG. 5 shows a cross section through the flow restrictor in the case of a large pressure difference and with a correspondingly highly deflected spring tongue, and also a curve which illustrates the non-linear dependence of the deflection and the spring force.

FIGS. 4 and 5 illustrate the non-linear relation between the spring force F and deflection s. FIG. 4 shows the relatively low deflection s of the flat form spring 11 or of a spring tongue 12 of the flat form spring 11 in a range with a small pressure different $\Delta p$ and with a correspondingly low spring force F. FIG. 5 shows the comparatively high deflection s of the flat form spring 11 or of the spring tongue 12 in a range with a relatively large pressure difference $\Delta p$ and with a correspondingly high spring force F which increases to an intensified extent.

Figure 6:
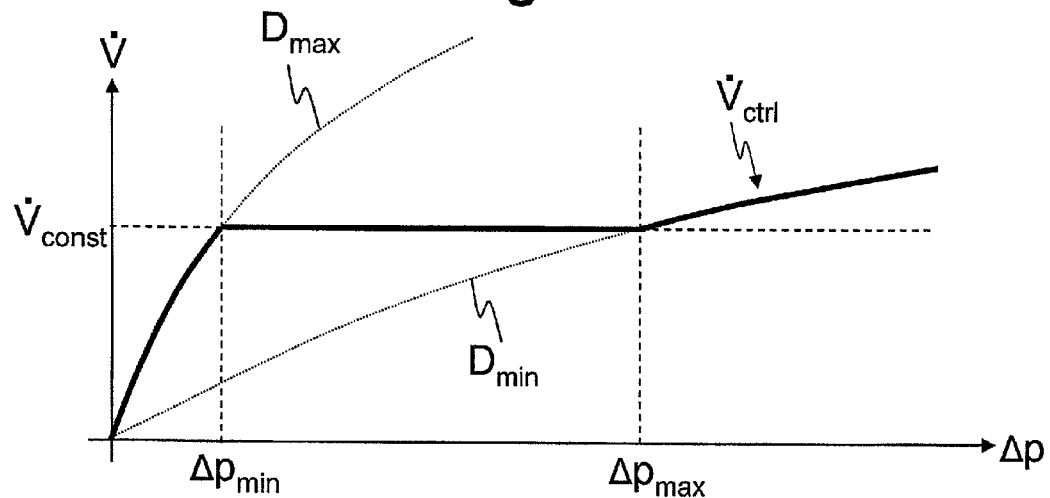
FIG. 6 illustrates diagrammatically the flow rate profile of the volume flow through the flow restrictor.

In FIG. 6, reference symbol $D_{max}$ designates the (flow rate) profile of the volume flow $\dot{V}$ through the flow restrictor 1 as a function of the differential pressure $\Delta p$ in the case of a maximum unregulated passage (completely open passage orifice). Reference symbol $D_{min}$ designates the (flow rate) profile of the volume flow $\dot{V}$ through the flow restrictor 1 as a function of the differential pressure $\Delta p$ in the case of a minimum passage which, when the flat form spring 11 or spring tongue 12, 17, 19 comes to bear completely, remains open (open remaining region in the case of a maximum-closed passage orifice). As is clear from FIG. 6, the regulated (flow rate) profile of the volume flow $\dot{V}_{ctrl}$ follows the thickly drawn line which, in the operating range between the minimum differential pressure $\Delta p_{min}$ and the maximum differential pressure $\Delta p_{max}$, assumes an essentially constant volume flow value $\dot{V}_{const}$, below the minimum differential pressure $\Delta p_{min}$ follows the profile $D_{max}$ of the volume flow $\dot{V}$ in the case of an unregulated maximum passage, and above the maximum differential pressure $\Delta p_{max}$ follows the profile $D_{min}$ of the volume flow $\dot{V}$ in the case of a minimum (that is to say, maximum-covered) passage.

As is clear in FIGS. 1a, 1b, 1c, 2a, 2b, 2c, 3a, 3b and 3c, the carrier 10 preferably has a round configuration to match the cross section of the liquid line 2 and has a projecting collar 15. The collar 15 is attached to the outer marginal region of the disk-shaped carrier 10 and is produced in one piece with the carrier 10, for example by pressure forming. In one variant, the collar 15 has a plurality of portions 15' which are spread slightly and engage into corresponding receptacles 21, for example a groove, in the wall of the liquid line 2 and axially fix the flow restrictor 1 in the liquid line 2.

In one design variant (not illustrated), part of the collar 15 is bent back onto the carrier 10 and firmly clamps the flat form spring 11 to the carrier 10. However, the flat form spring 11 may also be fastened to the carrier 10 by means of a rivet 16 or by adhesive bonding.

Figure 1B:
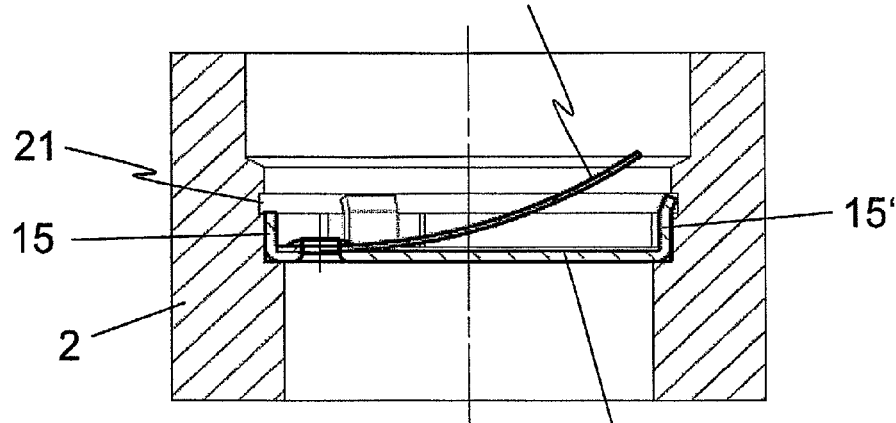
FIG. 1b shows a cross section through the flow restrictor of FIG. 1a, installed in a liquid line.
Figure 1C:
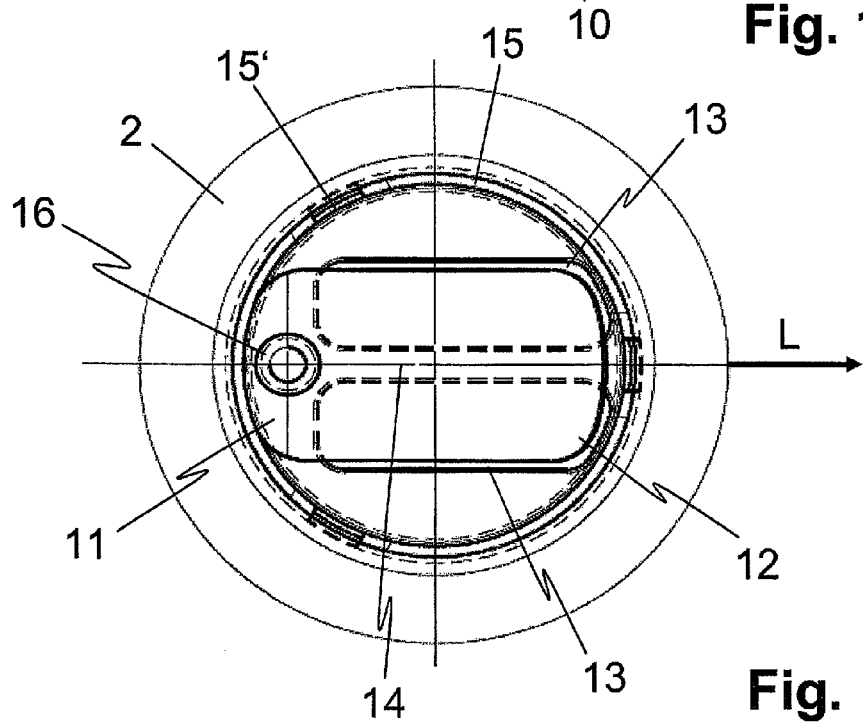
FIG. 1c shows a top view of the flow restrictor of FIG. 1a, installed in a liquid line.

In the preferred design variant according to FIGS. 1a, 1b and 1c, the flat form spring 11 comprises a spring tongue 12 and the carrier 10 has a passage with two orifices 13 lying next to one another. As is clear from FIG. 1c, the two orifices 13 and the spring tongue 12 have an essentially identical extent (length) in the longitudinal direction L. The carrier 10 has a web 14 which separates the two orifices 13 from one another. The flat form spring 11 is attached to the outer marginal region of the round carrier 10. The two orifices 13 are rectangular or trapezoidal and extend from the outer marginal region, where the flat form spring 11 is fastened, as far as the opposite outer marginal region of the carrier 10. The flat form spring 11 or the spring tongue 12 is oriented along (parallel to) the orifices 13 along the longitudinal axis of the web 14 and is arranged above the orifices 13 so that, when it comes to bear increasingly on the web 14 of the carrier 10 with a rising differential pressure $\Delta p$, it continuously increasingly covers and closes the orifices 13 within the defined operating range $[\Delta p_{min}, \Delta p_{max}]$, until, when the spring tongue 12 comes to bear to the maximum extent, a minimum passage remains. The minimum passage is formed by remaining regions, left open, in marginal regions of the orifices 13 which face away from the web 14 and which are not covered by the spring tongue 12.

In the design variant according to FIGS. 2a, 2b, 2c, 3a, 3b and 3c, the carrier 10 has a passage with four rotationally symmetrically arranged orifices 18 which are separated from one another in each case by a web 14. As is clear in FIGS. 2c and 3c, the webs 14 may be considered as spokes of a wheel which is formed from the round carrier 10 by the orifices 18. The orifices 18 are designed in each case as approximately triangular circle sectors of the round carrier 10 which do not extend completely as far as the center of the carrier 10. The flat form spring 11 comprises a plurality of rotationally symmetrically arranged spring tongues 17, 19 which are in each case arranged so that, with a rising differential pressure, they lie increasingly upon the carrier 10 and continuously reduce the orifices 18.

Figure 2A:
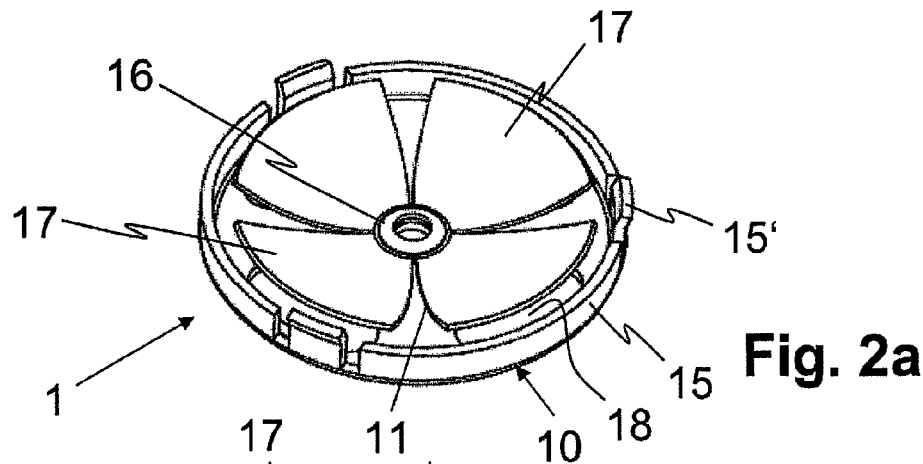
FIG. 2a shows a view of a flow restrictor with a flat form spring which has a plurality of rotationally symmetrically arranged spring tongues which are fastened, centered, and which are attached above a plurality of orifices separated from one another in each case by a web.
Figure 2B:
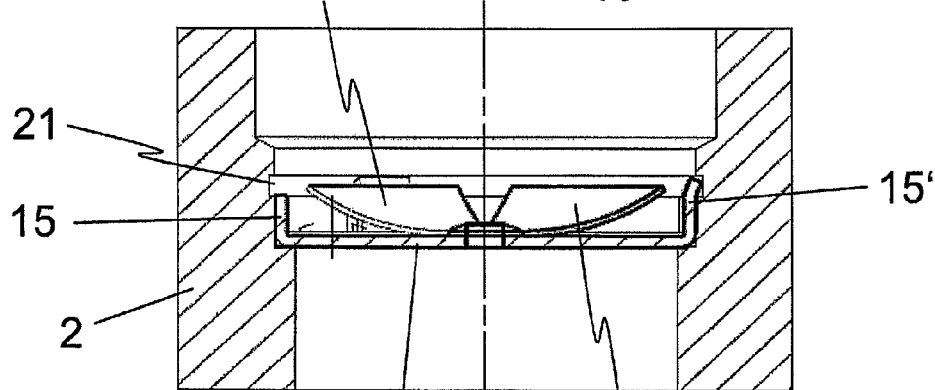
FIG. 2b shows a cross section through the flow restrictor of FIG. 2a, installed in a liquid line.
Figure 2C:
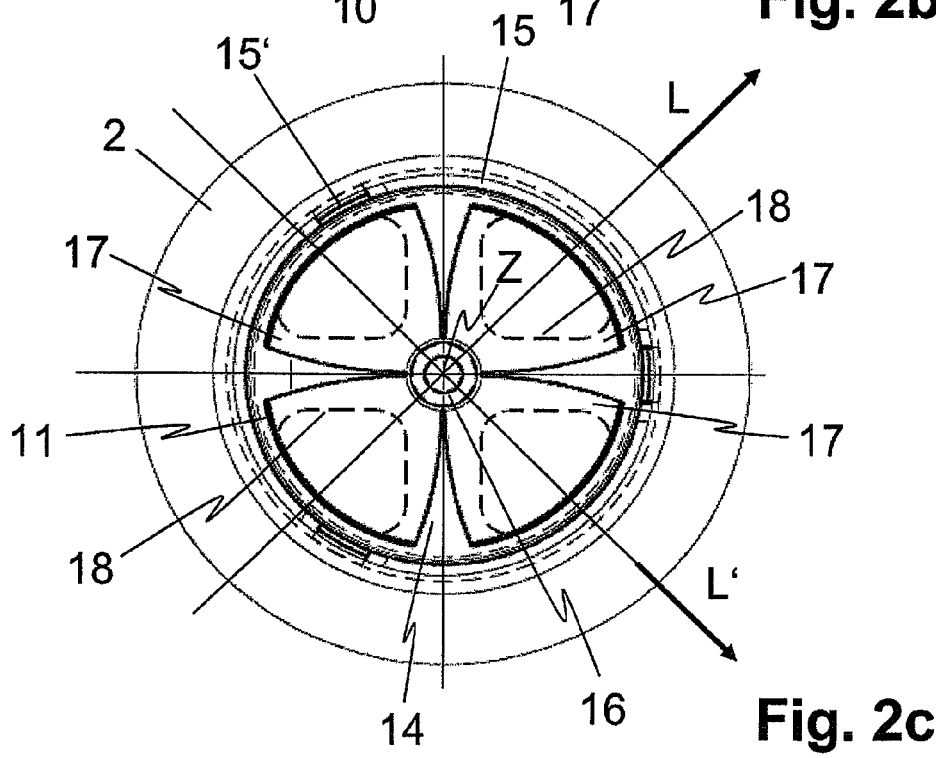
FIG. 2c shows a top view of the flow restrictor of FIG. 2a, installed in a liquid line.

In the design variant according to FIGS. 2a, 2b, 2c, the flat form spring 11 is attached in the center Z of the carrier 10 and the spring tongues 17 are assigned in each case to an orifice 18. As is clear from FIG. 2c, the orifices 18 and the spring tongues 17 have an essentially identical extent (length) along the longitudinal direction L, L'. The spring tongues 17 are in each case arranged above an assigned orifice 18 so that, with a rising differential pressure $\Delta p$, they in each case lie increasingly upon the two webs 14 which delimit the respective orifice 18. The orifices 18 are thus continuously increasingly covered and closed within the defined operating range $[\Delta p_{min}, \Delta p_{max}]$, until, when the spring tongue 17 comes to bear to the maximum extent, a minimum passage remains. In the case of the orifices 18, the minimum passage is formed in each case by a remaining region, left open, in marginal regions of the orifices 18 which face away from the center Z and which are not covered by the spring tongues 17.

Figure 3A:
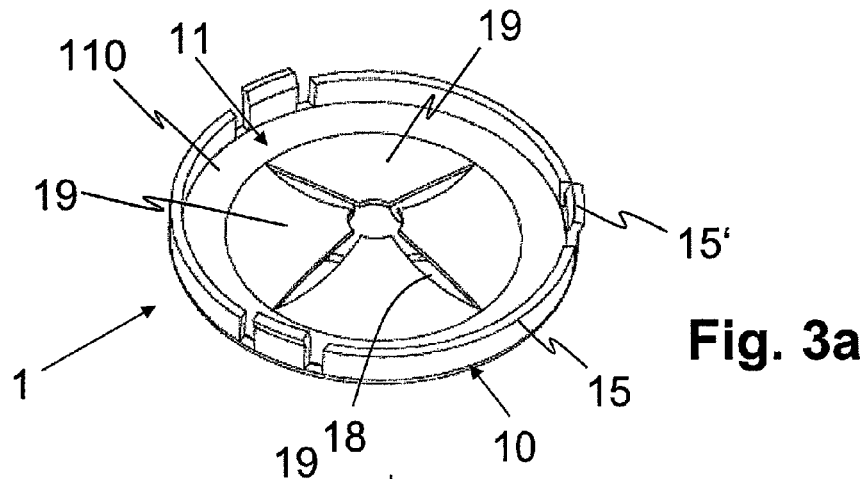
FIG. 3a shows a view of a flow restrictor with a flat form spring which has a plurality of rotationally symmetrically arranged spring tongues which are fastened to the outer marginal region of the flow restrictor and which are attached above a plurality of orifices separated from one another in each case by a web.
Figure 3B:
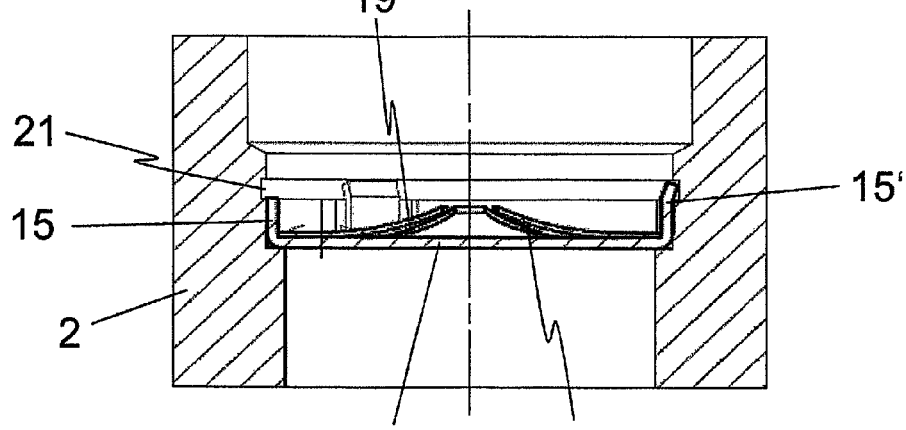
FIG. 3b shows a cross section through the flow restrictor of FIG. 3a, installed in a liquid line.
Figure 3C:
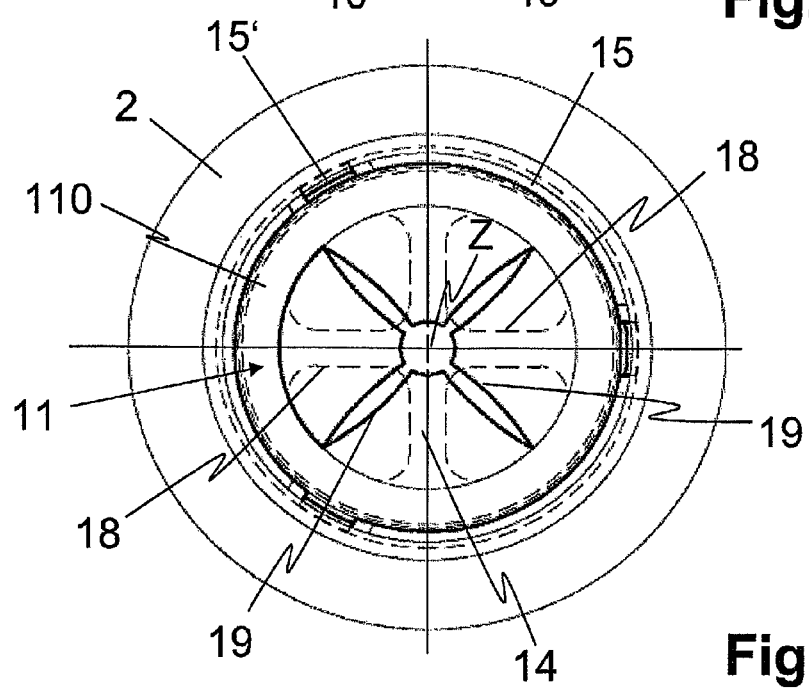
FIG. 3c shows a top view of the flow restrictor of FIG. 3a, installed in a liquid line.

In the design variant according to FIGS. 3a, 3b, 3c, the flat form spring 11 has an outer tire region 110 which is attached to the carrier 10. In contrast to the design variant according to FIGS. 2a, 2b, 2c, therefore, the spring tongues 19 are fastened to the outer marginal region of the carrier 10.

As is clear from FIG. 3c, the orifices 18 and the spring tongues 19 have an essentially identical extent (length) in their longitudinal direction, that is to say along their respective axis of symmetry, from the tire region 110 toward the center Z. The spring tongues 19 are arranged in each case above an assigned web 14 so that, with a rising differential pressure $\Delta p$, they in each case lie increasingly upon the respective web 14 and increasingly cover the two orifices 18 adjacent to the web 14. Thus, the orifices 18 are continuously increasingly covered and closed within the defined operating range $[\Delta p_{min}, \Delta p_{max}]$, until, when the spring tongue 19 comes to bear to the maximum extent, a minimum passage remains. In the case of the orifices 18, the minimum passage is formed in each case by a region, left open, between two adjacent spring tongues 19 along the axis of symmetry of the respective orifice, which region is not covered by the spring tongues 19.

A person skilled in the art will understand that even three or more than four orifices 18 and corresponding spring tongues 17, 19 may be provided.

Figure 7:
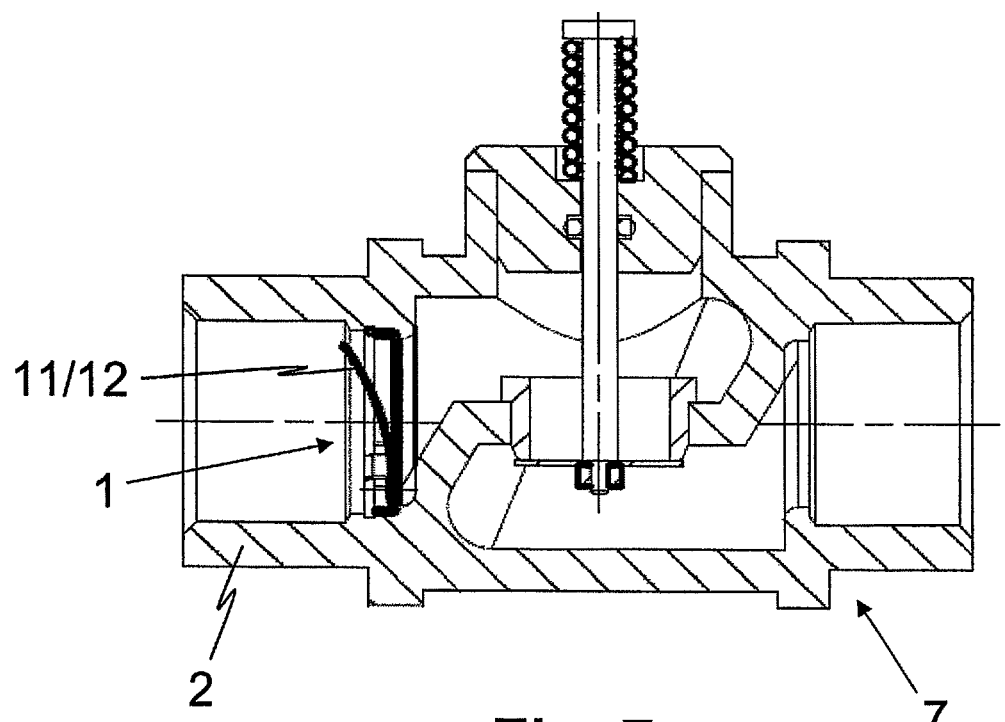
FIG. 7 shows a cross section through a lifting valve, with a flow restrictor installed in the liquid supply line.

FIG. 7 shows a cross section through a lifting valve 17 with a removably or fixedly installed flow restrictor 1 (according to one of the design variants described) in the liquid supply line 2.

Figure 8:
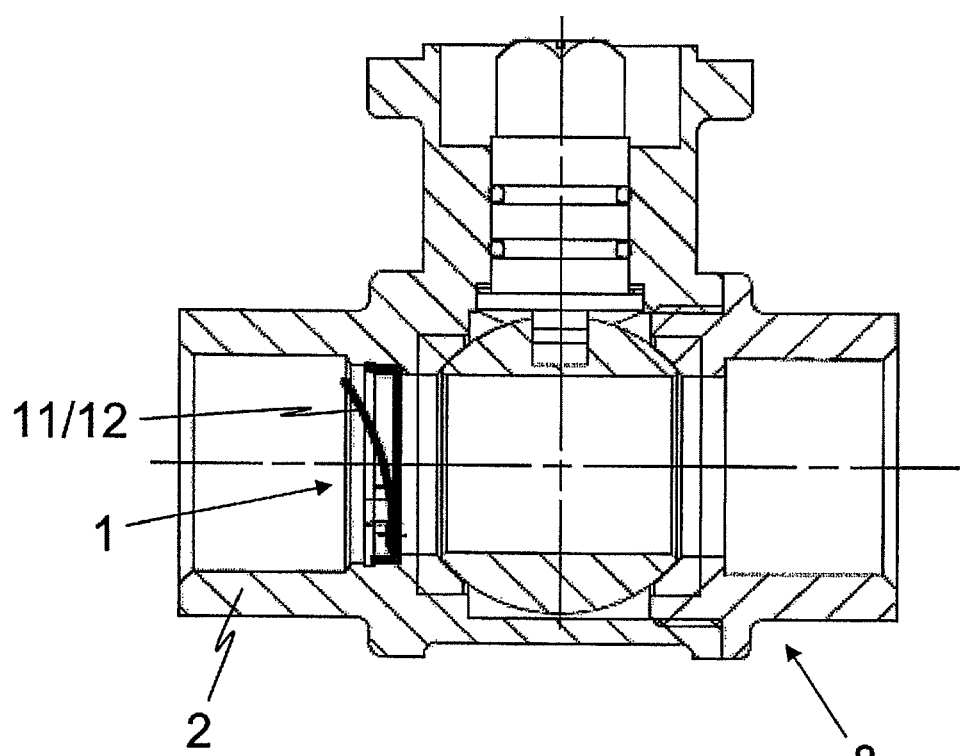
FIG. 8 shows a cross section through a ball valve, with a flow restrictor installed in the liquid supply line.

FIG. 8 shows a cross section through a ball valve 8 with a removably or fixedly installed flow restrictor 1 (according to one of the design variants described) in the liquid supply line 2.

FIGS. 9a, 9b, 9c and 9d show views, a cross section and top views of a flow restrictor 1 with a flat form spring 11 which has two spring tongues 27 fastened to a fastening web 34 running transversely across the flow restrictor 1 between the outer marginal regions. In this case, the fastening of the spring 11 on the web 34 may be adhesively bonded, riveted or configured according to the other fastening methods mentioned above. Each part region of the spring 11, that is to say each spring tongue 27, is in each case attached above two orifices 23 separated from one another by a web 24. The orifices therefore occupy approximately, minus the webs 24 and 34, in each case a quadrant of the circular passage for the flow restrictor 1.

Figure 9D:
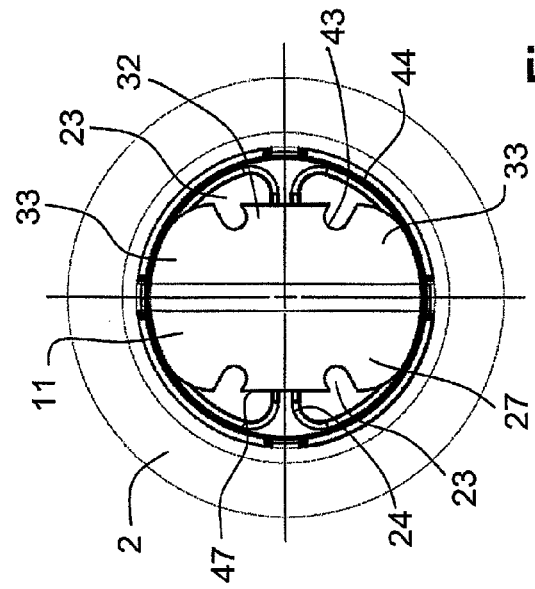
FIG. 9d shows a top view of the flow restrictor of FIG. 9a, installed in a liquid line.
Figure 9C:
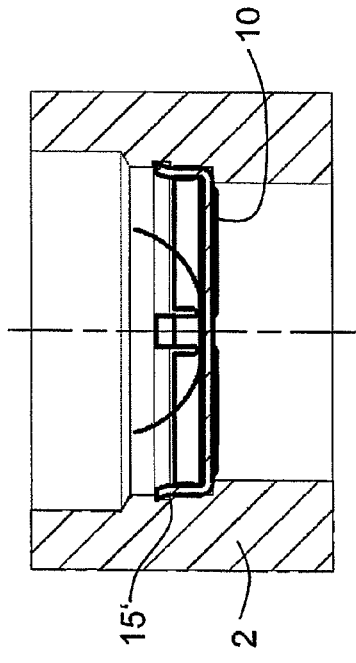
FIG. 9c shows a cross section of the flow restrictor of FIG. 9a, installed in a liquid line.
Figure 9A:
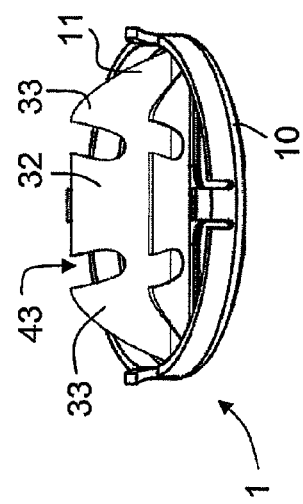
FIG. 9a shows a view of a flow restrictor with a flat form spring which has two spring tongues which are fastened to a fastening web running transversely across the flow restrictor between the outer marginal regions and which are attached in each case above two orifices separated from one another by a web.
Figure 9B:
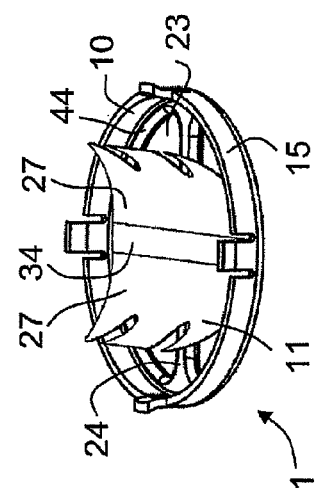

In the cross section of FIG. 9c, it is clear that in the initial position, that is to say without a fluid flow, the spring tongues 27 have a tangent angle of between 10 and 30 degrees with respect to the longitudinal axis of the liquid line 2. With a rising fluid flow, this curvature diminishes, and, in particular, the middle part 32 of the spring tongue 27 is laid onto the web 24, while the lateral parts 33 of the spring tongues 37 are laid on the marginal regions 44 of the carrier.

Between the middle part 32 and the lateral parts 33 of the spring tongues 27, there are recesses 43 which may be designed, in particular, as punched-out portions. These correspond, in a top view, to half an ellipse or to an ovally rounded slot. If the mid-axis of a spring tongue 27 which is arranged above the web 24 is assigned the angle 0 degrees in the radial direction, these two recesses 43 of a spring tongue 27 are arranged at an angle of between 20 and 45 degrees, in particular of approximately 30 degrees.

The spring 11, when it is flattened and does not have the prestressed form illustrated in FIG. 9c, is not a complete circular disk, but, instead, is cut off particularly in the region of the middle part 32. The cut-off edge corresponds to a chord 47 of the circle. This chord 47 can, rounded in the lateral parts 33, merge into the circular margin of the spring 11. Thus, when the spring 11 lies completely on the webs 24 and 34, a twofold remaining passage is obtained. This is, on the one hand, in the region of the recesses 43 and, on the other hand, the space of the two orifices 23 which remains on the far side of the chord 47. It is clear that, in an exemplary embodiment not illustrated in the drawings, on the one hand, only the recesses 43 may be present and, on the other hand, only the remaining space of the two orifices 23 which is predetermined by the chords may be present.

Here, too, the collar 15 has a plurality of portions 15' which are slightly spread and can axially fix the flow restrictor 1 in the liquid line 2.

Figure 10:
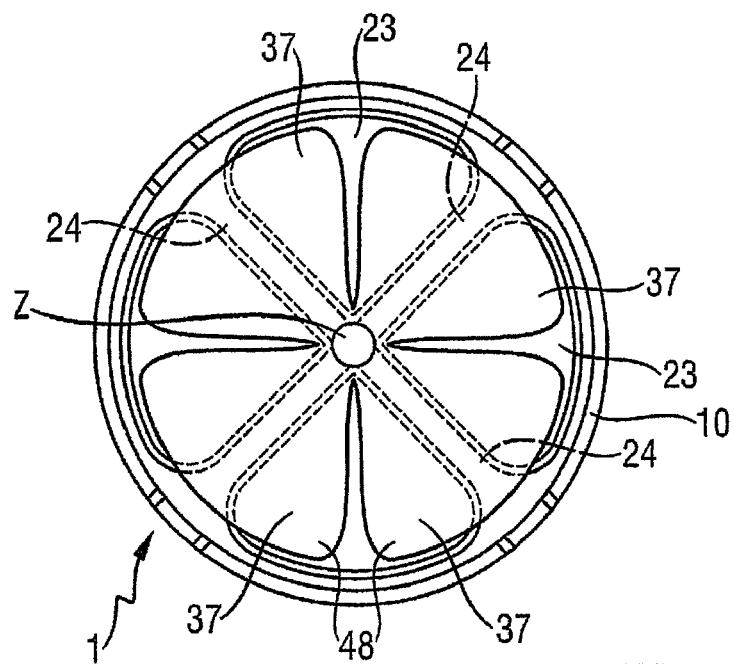
FIG. 10 shows a top view of a flow restrictor with a flat form spring which has four rotationally symmetrically arranged spring tongues which are fastened to the center of the flow restrictor and which are attached in each case via an assigned web which separates two orifices, assigned in each case to a spring tongue, from one another.

FIG. 10 shows a top view of a flow restrictor 1 with a flat form spring 11 which has four rotationally symmetrically arranged spring tongues 37 fastened at the center Z of the flow restrictor 1. These spring tongues 37 are rotated through 45 degrees, as compared with the exemplary embodiment of FIG. 2, so that they are in each case attached above an assigned web 24 which separates two orifices 23, assigned in each case to a spring tongue 37, from one another. In other words, here, each orifice 23 is assigned in each case two spring tongues 37. The passage regions left free arise, here, from the cloverleaf-like intermediate orifices between the spring tongues 37. In another exemplary embodiment not illustrated in the drawings, the corners 48 of the spring tongues may be cut off, in order to form more extensive recesses, or recesses may be present which correspond to the oval punched-out portions according to the exemplary embodiment of FIG. 9.

Figure 11:
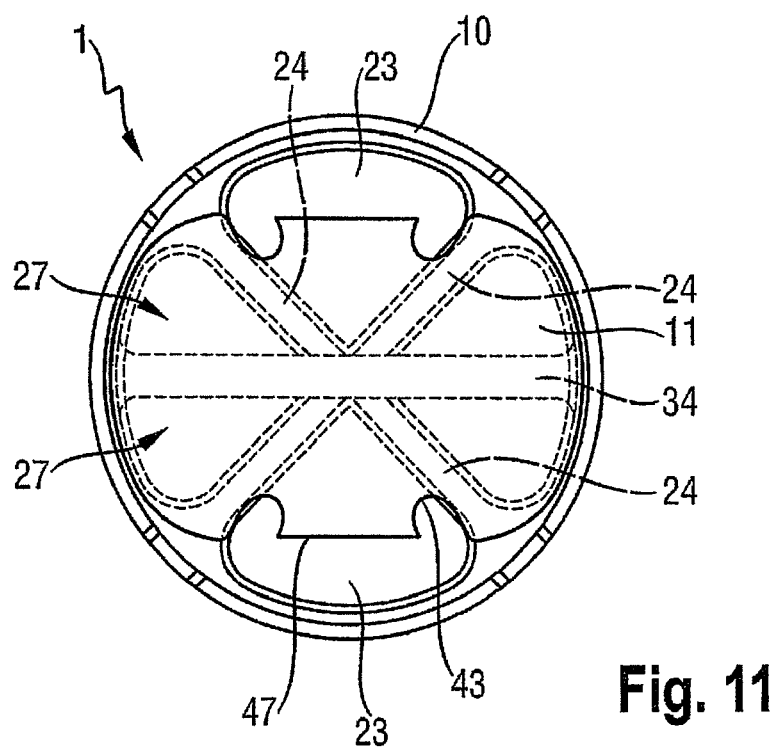
FIG. 11 shows a top view of a further flow restrictor with a flat form spring according to FIG. 9, the two spring tongues of which are attached in each case via two assigned webs which separate the passage into three orifices assigned in each case to a spring tongue.

Finally, FIG. 11 shows a top view of a further flow restrictor 1 with a flat form spring 11 which is modified in relation to FIG. 9 and two spring tongues of which are attached in each case above two assigned webs 24. The webs 24 intersect with one another at the center at a 90 degree angle and intersect with the fastening web 34 at a 45 degree angle. Here, therefore, the passage is divided into three orifices 23 assigned in each case to a spring tongue 27. Recesses 43 and the chord portion 47 correspond to those of FIG. 9, so that the remaining passage region is left open particularly in the middle portion 32, while the lateral spring tongue regions are laid on the marginal region 44 of the carrier 10. However, it is also possible that the recesses 43 are also or only or additionally provided in the lateral regions 33.

The spring 11 is preferably made from a spring steel which is present, in particular in a range of between approximately 30 degrees, as in the exemplary embodiments of FIGS. 1, 2 and 3, or up to 80 degrees, as in the exemplary embodiments of FIGS. 9 and 11. The width of the webs 14 and 24 is configured so that it forms a reliable mechanical bearing surface. For this purpose, a width of 5 to 10%, at most 20%, of the diameter of the flow restrictor 1 or of the width, projecting on both sides, of the flat form spring 11 is sufficient.

The invention claimed is:

1. A flow restrictor (1) for limiting a volume flow through a liquid line (2), comprising:
    a carrier (10) with a passage and a bent flat form spring (11) which is attached to the carrier (10) and which is designed to be flattened increasingly with a rising differential pressure ($\Delta p$),
    wherein, the flat form spring (11) has at least one spring tongue (12, 17, 19),
    wherein, the passage comprises at least two orifices (13, 18) lying next to one another, the spring tongue (12, 17, 19) and the orifices (13, 18) having an essentially identical extent in each case in a longitudinal direction,
    wherein, the carrier (10) comprises at least one web (14) which in each case separates two orifices (13, 18) lying next to one another from one another, and
    wherein, each spring tongue (12, 19) is configured and arranged above the orifices (13, 18) so that, with a rising differential pressure ($\Delta p$), said spring tongue increasingly lies upon the web (14) and continuously reduces the orifices (13, 18), in order to reduce the passage continuously within a defined pressure range, the orifices (18) remaining open in defined remaining regions.

2. The flow restrictor (1) as claimed in claim 1, wherein the flat form spring (11) is fastened to an outer marginal region of the carrier (10), and in that the at least two orifices (13, 18) extend from the outer marginal region, where the flat form spring (11) is fastened, as far as the opposite outer marginal and region of the carrier (10).

3. The flow restrictor (1) as claimed in claim 1, wherein the passage comprises a plurality of rotationally symmetrically arranged orifices (18), and in that the flat form spring (11) comprises a plurality of rotationally symmetrically arranged spring tongues (17, 19) which are in each case arranged so that, with a rising differential pressure ($\Delta p$), they lie increasingly upon the assigned webs (14) and continuously reduce the orifices (18).

4. The flow restrictor (1) as claimed in claim 3, wherein the spring tongues (19) are fastened to an outer marginal region of the carrier (10).

5. The flow restrictor (1) as claimed in claim 3, wherein the spring tongues (17) are fastened in the center (Z) of the carrier (10).

6. The flow restrictor (1) as claimed in claim 1, wherein the spring tongue (17) is arranged above the orifices (13, 18) so that, with a rising differential pressure ($\Delta p$), it also lies increasingly upon the side regions bordering the orifices (13, 18).

7. The flow restrictor (1) as claimed in claim 1, wherein the carrier (10) is configured as a round disk which comprises, on the outer marginal region, an erected collar (15) for insertion into a pipe line.

8. The flow restrictor (1) as claimed in claim 7, wherein part of the collar (15) is bent back onto the disk and clamps the flat form spring (11) to the carrier (10).

9. A method for limiting a volume flow through a liquid line (2), comprising:
    attaching a bent flat form spring (11) to a carrier (10) with a passage, and
    flattening the flat form spring (11) increasingly with a rising differential pressure ($\Delta p$),
    wherein, the flat form spring (11) is provided with at least one spring tongue (12, 17, 19) and the passage is provided with at least two orifices (13, 18) lying next to one another, the spring tongue (12, 17, 19) and the orifices (13, 18) being configured with an essentially identical extent in each case in a longitudinal direction, wherein, the carrier (10) comprises at least one web (14) which in each case separates two orifices (13, 18) lying next to one another from one another, and wherein, each spring tongue (12, 19) is configured and arranged above the orifices (13, 18) so that, with a rising differential pressure ($\Delta p$), said spring tongue lies increasingly upon the web (14) and continuously reduces the orifices (13, 18), in order to reduce the passage continuously within a defined pressure range, the orifices (18) remaining open in defined remaining regions.

10. The flow restrictor (1) as claimed in claim 2, wherein the spring tongue (17) is arranged above the orifices (13, 18) so that, with a rising differential pressure ($\Delta p$), it also lies increasingly upon the side regions bordering the orifices (13, 18).

11. The flow restrictor (1) as claimed in claim 3, wherein the spring tongue (17) is arranged above the orifices (13, 18) so that, with a rising differential pressure ($\Delta p$), it also lies increasingly upon the side regions bordering the orifices (13, 18).

12. The flow restrictor (1) as claimed in claim 4, wherein the spring tongue (17) is arranged above the orifices (13, 18) so that, with a rising differential pressure ($\Delta p$), it also lies increasingly upon the side regions bordering the orifices (13, 18).

13. The flow restrictor (1) as claimed in claim 5, wherein the spring tongue (17) is arranged above the orifices (13, 18) so that, with a rising differential pressure ($\Delta p$), it also lies increasingly upon the side regions bordering the orifices (13, 18).

14. The flow restrictor (1) as claimed in claim 2, wherein the carrier (10) is configured as a round disk which comprises, on the outer marginal region, an erected collar (15) for insertion into a pipe line.

15. The flow restrictor (1) as claimed in claim 3, wherein the carrier (10) is configured as a round disk which comprises, on the outer marginal region, an erected collar (15) for insertion into a pipe line.

16. The flow restrictor (1) as claimed in claim 4, wherein the carrier (10) is configured as a round disk which comprises, on the outer marginal region, an erected collar (15) for insertion into a pipe line.

17. The flow restrictor (1) as claimed in claim 5, wherein the carrier (10) is configured as a round disk which comprises, on the outer marginal region, an erected collar (15) for insertion into a pipe line.

18. The flow restrictor (1) as claimed in claim 6, wherein the carrier (10) is configured as a round disk which comprises, on the outer marginal region, an erected collar (15) for insertion into a pipe line.

19. The flow restrictor (1) as claimed in claim 14, wherein part of the collar (15) is bent back onto the disk and clamps the flat form spring (11) to the carrier (10).

20. The flow restrictor (1) as claimed in claim 15, wherein part of the collar (15) is bent back onto the disk and clamps the flat form spring (11) to the carrier (10).

\* \* \* \* \*